United States Patent [19]

Elazari

[11] Patent Number: 5,522,944
[45] Date of Patent: Jun. 4, 1996

[54] MULTI-PURPOSE SOLAR ENERGY CONVERSION SYSTEM

[76] Inventor: Ami Elazari, 78 Shlomo Hamelech Street, Tel Aviv 64 512, Israel

[21] Appl. No.: 506,215

[22] Filed: Jul. 24, 1995

Related U.S. Application Data

[63] Continuation of Ser. No. 814,094, Dec. 26, 1991, abandoned.

[30] Foreign Application Priority Data

Jan. 21, 1991 [IL] Israel .......................................... 96989

[51] Int. Cl.⁶ ................................................ H01L 31/058
[52] U.S. Cl. ......................... 136/248; 126/585; 126/586; 136/293; 320/2; 320/19; 320/20; 323/906
[58] Field of Search ..................... 136/248, 293; 320/2, 19–20; 323/906; 126/585–586

[56] References Cited

U.S. PATENT DOCUMENTS

| | | | |
|---|---|---|---|
| 4,080,221 | 3/1978 | Manelas | 136/248 |
| 4,137,097 | 1/1979 | Kelly | 136/248 |
| 4,493,940 | 1/1985 | Takaoka | 136/248 |

Primary Examiner—Aaron Weisstuch
Attorney, Agent, or Firm—Abelman, Frayne & Schwab

[57] ABSTRACT

Apparatus for converting solar energy to thermal and electrical energy including a substantially unsealed enclosure, an array of photovoltaic cells for converting solar energy to electrical energy located within the enclosure, and a plurality of interconnected heat collecting tubes located within the enclosure and disposed on the same plane as the array of photovoltaic cells for converting solar energy to thermal energy in a fluid disposed within the heat collecting tubes.

20 Claims, 3 Drawing Sheets

MULTI-PURPOSE SOLAR ENERGY CONVERSION SYSTEM

This is a continuation of application Ser. No. 07/014,094 filed Dec. 26 1991, abandoned.

FIELD OF THE INVENTION

The present invention relates in general to the use of solar energy and more particularly to conversion of solar energy to electrical and thermal energy.

BACKGROUND OF THE INVENTION

The conversion of solar energy to thermal or electrical energy through the use of systems such as photovoltaic arrays, passive absorbers of solar energy, solar furnaces etc., is well established in the art. Systems have also been proposed fop simultaneously converting solar energy to thermal and electric energy; however, these systems employ apparatus which is complicated to fabricate, such as sealed solar collector enclosures or flat plate thermal collectors mounted under the photovoltaic cells.

For example, U.S. Pat. No. 4,080,221 describes a system for converting solar energy to electric and thermal energy which employs a substantially sealed, weather tight enclosure for the solar collectors. U.S. Pat. No. 4,493,940 describes a flat plate thermal collector on which photovoltaic cells are mounted with the assembly being surrounded by an enclosure that is sealed by a metal sealing collar, and U.S. Pat. No. 4,373,308 describes a flat plate solar collector below and in spaced relationship to an array of photovoltaic cells.

Other systems for converting solar energy to electric and thermal energy employ complex methods of transferring thermal energy. For example, U.S. Pat. No. 4,248,643 describes a solar collector enclosure through which a fluid is circulated to carry heat away from the photovoltaic cells. U.S. Pat. No. 4,137,098 describes a solar collector enclosure through which air is circulated to carry heat away from the solar collectors, and U.S. Pat. No. 4,389,533 describes a solar collector enclosure housing phase change materials which are melted by the collected thermal energy thereby storing the energy.

There is therefore an unresolved need in the art for a simple, reliable and inexpensive system for converting solar energy to thermal and electrical energy.

SUMMARY OF THE INVENTION

The invention provides apparatus for converting solar energy to thermal and electrical energy.

There is thus provided in accordance with the present invention apparatus for converting solar energy to thermal and electrical energy including a substantially unsealed enclosure, an array of photovoltaic cells for converting solar energy to electrical energy located within the enclosure, and a plurality of interconnected heat collecting tubes located within the enclosure and disposed on the same plane as the array of photovoltaic cells for converting solar energy to thermal energy in a fluid disposed within the heat collecting tubes.

According to a preferred embodiment of the invention, the apparatus for converting solar energy to thermal and electrical energy additionally includes a battery bank electrically connected to the arrays of photovoltaic cells for storing DC electrical energy produced by the photovoltaic cells, a DC/AC inverter for converting DC electrical power provided by the battery bank to AC electrical power, an alternative power source such as an electric power grid or a generator for providing electrical energy when battery voltage level falls below a predetermined level, a battery charger electrically connected to the battery bank and the alternative power source for charging the battery from the alternative power source, circuits which provide AC and/or DC electrical power to electrical appliances and a control panel for electrically connecting and disconnecting components of the electrical system.

According to a preferred embodiment of the invention the control panel includes voltage regulators, apparatus for detecting the battery voltage level, switching circuits for connecting the battery bank to the DC/AC inverter when the battery voltage level exceeds a first predetermined level, switching circuits for connecting the DC/AC inverter to at least one of the circuits which provide AC electrical power when the battery voltage exceeds first predetermined level, switching circuits for connecting the battery bank to at least one of the circuits which provide DC electrical power when the battery voltage exceeds first predetermined level, switching circuits for connecting the DC/AC inverter to all of the circuits which provide AC electrical power when the battery voltage exceeds a second predetermined value, switching circuits for connecting the battery bank to all of the circuits which provide DC electrical power when the battery voltage exceeds a second predetermined value, switching circuits for connecting at least one of the circuits which provide AC power to power lines from the alternative power source when the battery voltage falls below the second predetermined level, and switching circuits for connecting all of the circuits which provide AC power to power lines from the alternative power source when the battery voltage falls below the first predetermined level.

According to another preferred embodiment of the invention the alternative power source is an electric power grid.

According to yet another preferred embodiment of the invention the alternative power source is a generator.

According to yet another preferred embodiment of the invention the apparatus for converting solar energy to electrical and thermal energy additionally includes apparatus to transfer electric power from the photovoltaic cells to the electric power grid when the battery bank is fully charged.

According to a preferred embodiment of the invention, the apparatus for converting solar energy to thermal and electrical energy further includes a water circulation system comprising, a hot water storage tank, at least one hot water tap, at least one room heating device including a heat exchange element, pipes to connect components of the water circulation system, a pump to circulate water between components of the water circulation system, an outlet from the hot water storage tank which receives water from the interconnected heat collecting tubes of the solar collector, an inlet to the hot water storage tank which receives water from the interconnected heat collecting tubes, an inlet to the hot water storage tank which receives water from the main water supply, a thermostatically operated electrical relay valve for controlling water circulation between the hot water storage tank and the interconnected heat collecting tubes, an outlet from the hot water storage tank from which at least one hot water tap receives water, an outlet from the hot water storage tank from which a heat exchange element of the at least one room heating device receives water, and an inlet to the hot water storage tank which receives water returned from the room heating devices.

According to a further preferred embodiment of the invention the hot water storage tank is formed from an insulating material.

According to another preferred embodiment the room heating device is a baseboard radiant heater.

According to a further preferred embodiment of the invention the pipes which connect the components of the water circulation system are fabricated from a rust resistant material.

According to still another preferred embodiment of the invention the pump to circulate water between the components of the water circulation system is powered by an electric motor.

According to yet a further preferred embodiment of the invention the electric motor is powered by the circuits for providing DC electrical power to electrical appliances.

According to yet another preferred embodiment of the invention the interconnected heat collecting tubes are fabricated from a material capable of absorbing solar energy impinging on the surface of the interconnected heat collecting tubes, transforming it to thermal energy and transferring the thermal energy to the water disposed within the interconnected heat collecting tubes.

According to a preferred embodiment of the invention, the substantially unsealed enclosure includes a frame, a back plate, a glass cover, insulating material disposed between the back plate and frame of the enclosure and the array of photovoltaic cells and interconnected heat collecting tubes within the enclosure, and openings in the frame to permit electrical connections to the photovoltaic cells and connections between the pipes which connect components of the water circulation system and the interconnected heat collecting tubes.

According to a further preferred embodiment of the invention the frame and back plate are fabricated from a rust resistant material.

According to another preferred embodiment of the invention the glass cover is attached but not sealed to the frame.

There is also provided in accordance with the present invention a system for converting solar energy to electrical and thermal energy including a substantially unsealed enclosure surrounding an array of photovoltaic cells and a plurality of heat collecting tubes disposed on the same plain as the array of photovoltaic cells, an electrical system that provides power to electrical appliances and where a portion of the power is derived from the photovoltaic cells, and a water circulation system in which water is circulated and where the water is heated by the heat collecting tubes.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
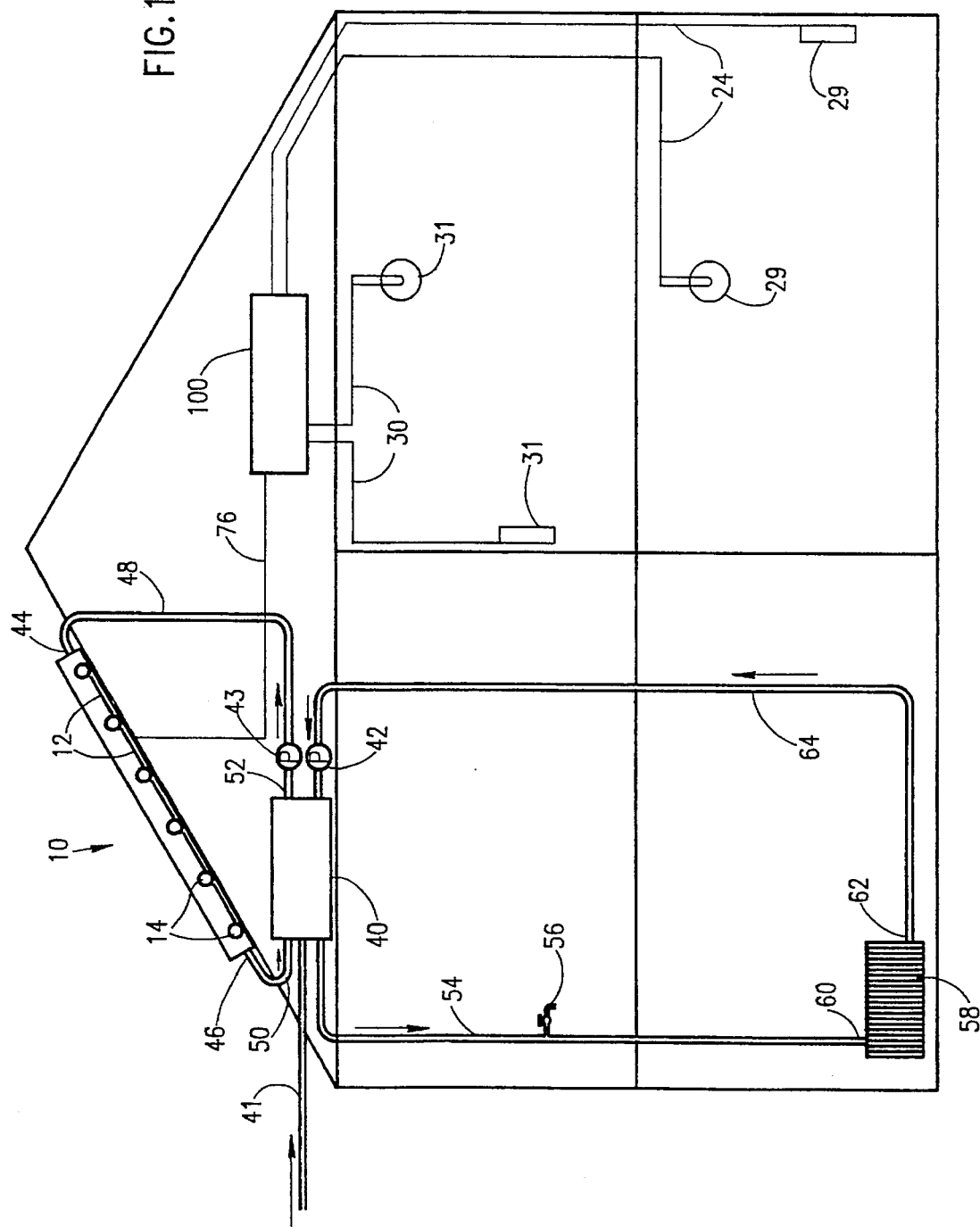
FIG. 1 is a diagrammatic sectional illustration of a building incorporating apparatus for converting solar energy to electrical and thermal energy constructed and operative in accordance with a preferred embodiment of the invention.
Figure 2:
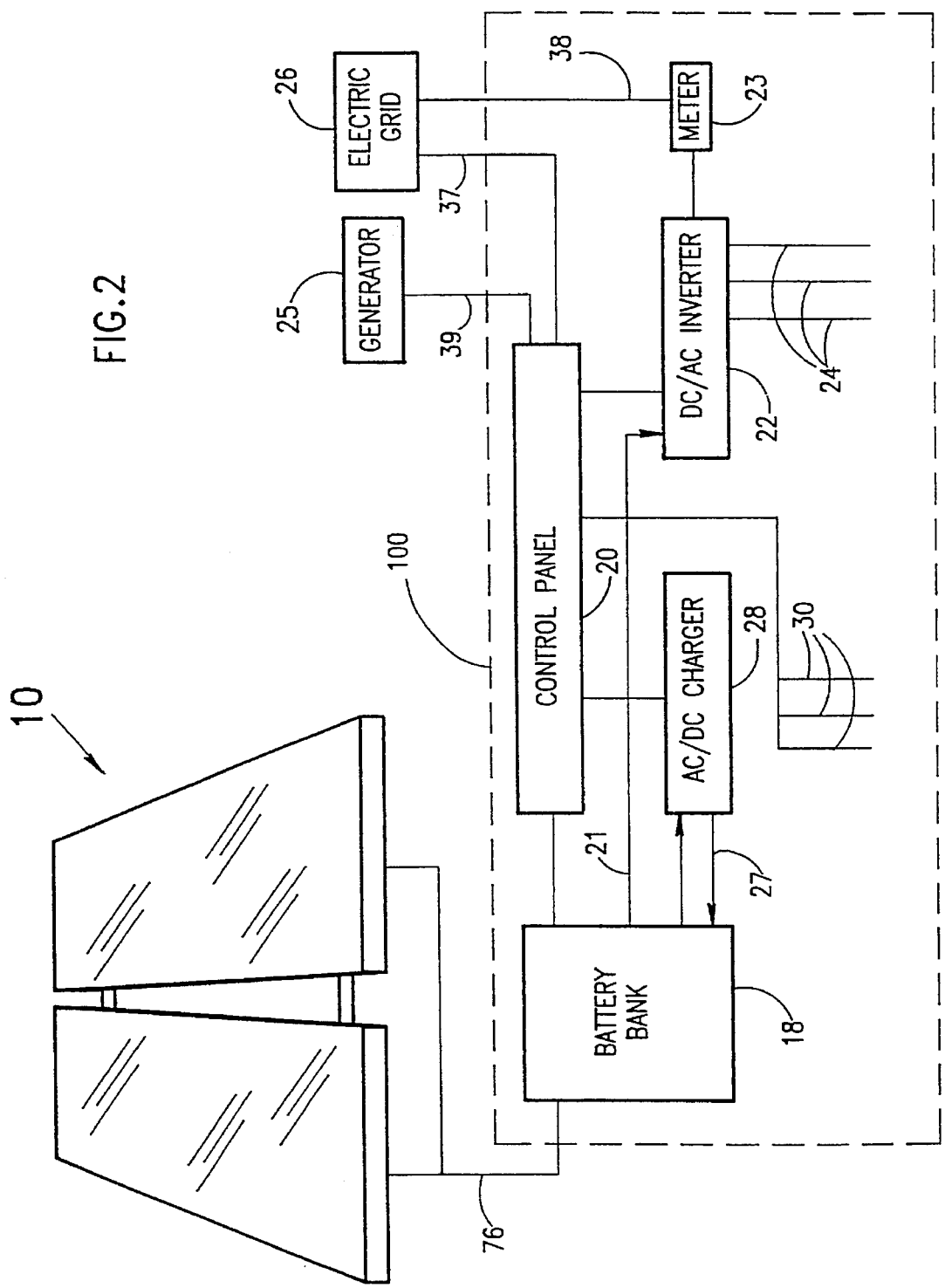
FIG. 2 is a schematic wiring diagram of the electrical system of the apparatus of FIG. 1.
Figure 3:
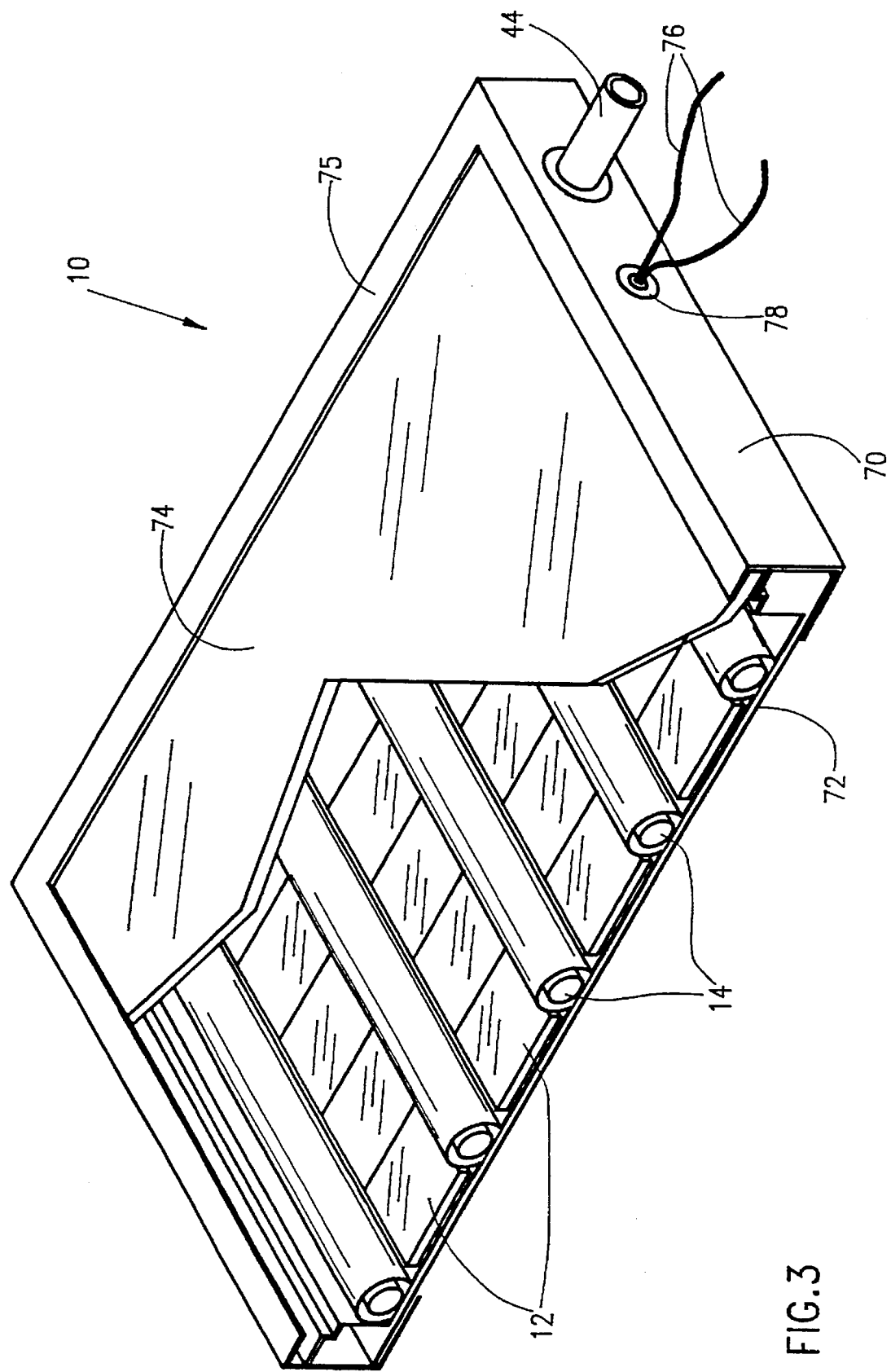
FIG. 3 is a partially cut away side perspective view illustration of the solar collector enclosure of the apparatus of FIG. 1.

Reference is now made to FIGS. 1–3 which illustrates apparatus for converting solar energy to electrical and thermal energy constructed and operative in accordance with a preferred embodiment of the invention and comprising a substantially unsealed enclosure 10 surrounding an array of photovoltaic cells 12 for converting solar energy to electrical energy and a plurality of interconnected heat collecting tubes 14 for converting solar energy to thermal energy with the photovoltaic cells and the interconnected heat collecting tubes being disposed on the same plane. The array of photovoltaic cells 12 typically includes single-crystal silicon solar cells each 4.05 inches square, fabricated from Czochralski-grown ingots and typically comprises an array such as the M55 Module of Solar sales Pty Ltd. Welshpool, Australia. The interconnected heat collecting tubes are generally rigid black plastic heat collecting tubes commercially available from Miromit Ltd., Ashkelon, Israel.

The photovoltaic cell array 12 is typically contained in two enclosures 10 (see FIG. 2) each enclosure 10 containing 10 lines of 20 square cells, each line capable of producing up to 20 Watts per cell/hour and each enclosure 10 being capable of producing up to 2000 Watts per day (22 Amps at 12 Volts) for a total of 4000 Watts per day (44 Amps at 12 Volts) for two enclosures 10. Under Israeli winter conditions, however, an average of only six hours per day of strong sunlight can be expected which results in an average daily production of 2,400 Watts per day.

The photovoltaic array 12 is electrically connected to an electrical system 100. The electrical system 100 typically includes a battery bank 18 connected by cables 76 to the photovoltaic array 12. Battery bank 18 is also connected through a control panel 20 to circuits 30 which provide DC electrical power to electrical appliances 31 and by a cable 21 to a DC/AC inverter 22. The inverter 22 converts the DC current of the battery bank 18 to 220 V or 110 Volt, 50 Hz AC current and supplies it to circuits 24 which provide AC electrical power to electrical appliances 29.

The battery bank 18 typically comprises at least one sealed battery with a capacity of 100 to 5000 AH at a 24 hour rate. A suitable commercially available battery is the ABSOLYTE II GNB manufactured by SEC Ltd., Inver Bucks SL 09 AG, England. The control panel 20 and the inverter 22 are typically included in a single commercially available power supply unit such as the TRACE 2248 manufactured by Photocomm Inc., Scottsdale Ariz. USA.

If the voltage level of battery bank 18 falls below about 14.5 volts the control panel 20 prevents over discharge of the battery bank 18 by disconnecting the battery bank 18 from at least one of the circuits 30 which provide DC power to electrical appliances 31 and/or by disconnecting at least one of the circuits 24 which provide AC electrical power to electrical appliances 29 from the AC/DC inverter 22. Simultaneously the control panel 20 provides power to the circuits 24 which provide AC current to electric appliances 29 by connecting them to an alternative power source such as electric power grid 26 or a generator 25.

At the same time the control panel 20 can also connect an AC/DC battery charger 28, such as that incorporated in commercially available power supply unit TRACE 2248, by cable 27 to the battery bank 18 to recharge the battery bank and/or to provide power to the circuits 30 which provide DC electrical power to electrical appliances 31.

If the voltage level of battery bank 18 falls below 10.4 volts control panel 20 disconnects the battery bank 18 and the DC/AC inverter 22 from all the circuits 24 which provide AC electrical power and all the circuits 30 which provide DC electrical power to electrical appliances 29 and 31 respectively and connects all circuits 24 which provide AC electrical power to electrical appliances 29 to the electric power grid 26 via cable 37 or generator 25 via cable 39.

Reference is now made to FIG. 2 in which electrical system 100 is shown. The control panel 20 of electrical system 100 typically comprises voltage regulators (not shown) which maintain line voltage in AC and DC circuits, relays (not shown) to connect the various components of the electrical system, a battery bank voltage level detector (not shown) and circuits 38 to return power generated by the photovoltaic array 12 to the electric power grid when the battery bank 18 is fully charged. The return power path passes through battery bank 18, the DC/AC inverter 22, and metering apparatus 23 which records the amount of power returned to the electric power grid 26.

The voltage regulators can provide 110/120 or 220/240 AC power at ±1% RMS and 12 or 24 volts DC power at ±1% of the rated voltage. The voltage regulators, the battery bank voltage level detector and the metering apparatus are preferably commercially available units such as those incorporated in power supply unit Trace 2248.

Reference is now again made to FIG. 1. In FIG. 1 it can been seen that the hot water storage tank 40, which is typically a commercially available 60–120 liter galvanized iron tank such as that produced by Miromit, Ashkelon, Israel, receives water from the main water supply 41. Water is pumped from the hot water storage tank 40 by an electric water pump 43, such as the March 809 commercially available from Photocomm Inc. Scottsdale, Ariz., through valve 52 and pipe 48 to the inlet 44 of interconnected heat collecting tubes 14. The water passes through the network of interconnected heat collecting tubes 14 where it can be heated by thermal energy transferred to the water.

The thermal energy transferred to the water from the heat collecting network can reach about 6500 Kcal/day per enclosure 10 (see FIG. 3) or a total of 13,000 Kcal/day for the typical configuration of two plates. Water passes out of the network of interconnected heat collecting tubes 14 through outlet 46 and is returned to hot water storage tank 40 by pipe 50.

The circulation of water through the interconnected heat collecting tubes 14 is controlled by a thermostatically operated 12 volt electrical relay such as is commercially available from Gal 0z Ltd., Tel Aviv, Israel, which closes valve 52 when the water temperature exceeds an adjustably predetermined level. Water flows from the hot water storage tank 40 by gravitation through pipe 54 to tap 56 and radiant heater 58 which may be any of a number of commercially available units such as those produced by Eshet Elon Ltd., Upper Galil, Israel.

The water enters the heat exchanger (not shown) of heater 58 through inlet 60 passes through the heat exchanger where it can transfer thermal energy to the air in the room, exits the heat exchanger through outlet 62 and is returned to the hot water storage tank by being pumped through pipe 64 by pump 42 which is also typically a water pump such as the March 809.

Pumps 42 and 43 typically receive power from one of the DC circuits 30. Pipes 48, 50, 54 and 64 are typically fabricated from a rust resistant material such as anodized aluminum.

Reference is now made to FIG. 3 which illustrates the solar collector enclosure 10 of the apparatus of FIG. 1 in which it can be seen that the substantially unsealed enclosure 10 comprises a frame 70, 2184 mm×1270 mm×88 mm fabricated from stainless steel, a back plate 72 fabricated from anodized aluminum and fitted and bolted to the frame 70, and a tempered glass cover 74 loosely clamped to the frame 70 by flange 75. An insulating material, typically plastic foam, is disposed between the back plate 72 and frame 70 of the enclosure 10 and the array of photovoltaic cells 12 and interconnected heat collecting tubes 14. Cable 76 which connects photovoltaic array 12 with battery bank 18 passes through port 78 in frame 70. Inlet tube 44 provides water to the interconnected heat collecting tubes 14 and outlet 46 (see FIG. 1) receives water from the interconnected heat collecting tubes 14.

It will be appreciated by persons skilled in the art that the present invention is not limited to what has particularly been shown and described hereinabove. Rather the scope of the present invention is defined only by the claims which follow:

I claim:

1. Apparatus for converting solar energy to electrical and thermal energy comprising:

a substantially unsealed enclosure having a cover, a frame including a back wall, a plurality of side walls, and a flange adapted to receive said cover, with said cover being loosely clamped within said flange;

an array of photovoltaic cells for converting solar energy impinging thereon to electrical energy located within the enclosure to provide a source of electrical power;

a plurality of interconnected heat collecting tubes located within the enclosure and disposed on the same plane as the array of photovoltaic cells for converting solar energy impinging thereon to thermal energy in a fluid disposed within the heat collecting tubes to provide a source of thermal energy;

electrical energy transfer means for conducting electrical power from said photovoltaic cells outward of said enclosure;

thermal energy transfer means for conducting thermal energy from said heat collecting tubes outward of said enclosure; whereby said enclosure provides an output of both electrical power and thermal energy in response to impinging solar energy.

2. Apparatus according to claim 1 and additionally comprising a water circulation system which includes:

a hot water storage tank;

at least one hot water tap;

at least one room heating device including a heat exchange element;

pipes to connect components of the water circulation system;

pumps to circulate water between components of the water circulation system;

an outlet from the hot water storage tank which receives water from the interconnected heat collecting tubes of the solar collector;

an inlet to the hot water storage tank which receives water from the interconnected heat collecting tubes;

an inlet to the hot water storage tank which receives water from the main water supply;

a thermostatically operated electrical relay valve for controlling water circulation between the hot water storage tank and the interconnected heat collecting tubes;

an outlet from the hot water storage tank from which at least one hot water tap receives water;

an outlet from the hot water storage tank from which a heat exchange element of the at least one room heating device receives water; and an inlet to the hot water storage tank which receives water returned from the room heating devices.

3. Apparatus according to claim 2 wherein the hot water storage tank is formed from an insulating material.

4. Apparatus according to claim 2 wherein the room heating device is a baseboard radiant heater.

5. Apparatus according to claim 2 wherein the pipes which connect the components of the water circulation system are fabricated from a rust resistant material.

6. Apparatus according to claim 2 wherein the pumps to circulate water between the components of the water circulation system are powered by an electric motor.

7. Apparatus according to claim 6 wherein an electric motor for the pumps of the water circulation system is powered by said circuit means of the electrical system for providing DC electrical power to the electrical devices.

8. Apparatus according to claim 1 wherein the interconnected heat collecting tubes are fabricated from a material capable of absorbing solar energy impinging on the surface of the interconnected heat collecting tubes, transforming it to thermal energy and transferring the thermal energy to the water disposed within the interconnected heat collecting tubes.

9. Apparatus for converting solar energy to electrical and thermal energy comprising:

a substantially unsealed enclosure including a loosely clamped cover;

an array of photovoltaic cells for converting solar energy impinging thereon to electrical energy located within the enclosure to provide a source of electrical power;

a plurality of interconnected heat collecting tubes located within the enclosure and disposed on the same plane as the array of photovoltaic cells for converting solar energy impinging thereon to thermal energy in a fluid disposed within the heat collecting tubes to provide a source of thermal energy;

electrical energy transfer means for conducting electrical power from said photovoltaic cells outward of said enclosure;

thermal energy transfer means for conducting thermal energy from heat collecting tubes outward of said enclosure;

an electrical system including:

a battery bank electrically connected to the array of photovoltaic cells for storing DC electrical energy produced by the photovoltaic cells;

a DC/AC inventor for converting DC electrical power provided by the battery bank to AC electrical power;

an alternative power source for providing electrical energy when battery voltage level falls below a predetermined level;

a battery charger electrically connected to the battery bank and the alternative power source for charging the battery from the alternative power source;

circuit means for providing AC electrical power to electrical devices;

circuit means for providing DC electrical power to electrical devices; and a control panel for electrically connecting and disconnecting components of the electrical system; whereby said enclosure provides an output of both electrical power and thermal energy in response to impinging solar energy.

10. Apparatus according to claim 9 wherein the control panel comprises:

voltage regulators;

means for detecting the battery voltage level;

means for connecting the battery bank to the DC/AC inverter when the battery voltage level exceeds a first predetermined level;

means for connecting the DC/AC inverter to at least one of the circuit means for providing AC electrical power when the battery voltage exceeds said first predetermined voltage;

means for connecting the battery bank to at least one of the circuit means for providing DC electrical power when the battery voltage exceeds said first predetermined voltage;

means for connecting the DC/AC inverter to all of the circuit means for providing AC electrical power when the battery voltage exceeds a second predetermined value;

means for connecting the battery bank to all of the circuit means for providing DC electrical power when the battery voltage exceeds said second predetermined value;

means for providing at least one of the circuit means for providing AC power with power from the alternative power source when the battery voltage falls below said second predetermined level; and means for providing all of the circuit means for providing AC power with power from the alternative power source when the battery voltage falls below said first predetermined level.

11. Apparatus according to claim 9 wherein the alternative power source is an electric power grid.

12. Apparatus according to claim 9 wherein the alternative power source is a generator.

13. Apparatus of claim 9 additionally comprising means to transfer electric power from the photovoltaic cells to the electric power grid when then battery bank is fully charged.

14. Apparatus according to claim 9 further including an electric motor powered by said circuit means for providing DC electrical power to the electrical devices.

15. Apparatus according to claim 9 wherein the substantially unsealed enclosure comprises:

a frame;

a back plate;

a glass cover loosely clamped to said frame;

insulating material disposed between the back plate and frame of the enclosure and the array of photovoltaic cells and interconnected heat collecting tubes within the enclosure; and openings in the frame to permit electrical connections to the photovoltaic cells and connections between the pipes which connect components of the water circulation system and the interconnected heat collecting tubes.

16. Apparatus according to claim 15 wherein the frame and back plate are fabricated from a rust resistant material.

17. Apparatus according to claim 16 wherein the glass cover is attached but not sealed to the frame.

18. Apparatus according to claim 9 wherein the control panel comprises:

voltage regulators;

means for detecting the battery voltage level;

mans for disconnecting the DC/AC inverter from all of the circuit means for providing AC electrical power when the battery voltage falls below a first predetermined value;

means for disconnecting the battery bank from all of the circuit means for providing DC electrical power when the battery voltage falls below said first predetermined value;

means for connecting the battery bank to the battery charger when the battery voltage level falls below a second predetermined level, which is greater than said first predetermined value;

means for disconnecting the DC/AC inverter from at least one of the circuit means for providing AC electrical power when the battery voltage falls below said second predetermined voltage;

means for disconnecting the battery bank from at least one of the circuit means for providing DC electrical power when the battery voltage falls below said second predetermined voltage;

means for providing at least one of the circuit means for providing AC power with power from the alternative power source when the battery voltage falls below said second predetermined level; and means for providing all of the circuit means for providing AC power with power from the alternative power source when the battery voltage falls below said first determined level.

19. The apparatus of claim 9, further including a fluid storage tank for the thermally heated fluid, and a thermostatically controlled means for circulating the fluid between said fluid storage tank and said interconnected plurality of heat collecting tubes within said substantially unsealed enclosure.

20. A system for converting solar energy to electrical and thermal energy comprising;

a substantially unsealed enclosure surrounding an array of photovoltaic cells and a plurality of heat collecting tubes disposed on the same plane as the array of photovoltaic cells;

said substantially unsealed enclosure including a cover, a frame including a back wall, a plurality of side walls, and a flange adapted to receive said cover, with said cover being loosely clamped within said flange;

an electrical system that provides power to electrical appliances and where at least a portion of the power can be derived from said photovoltaic cells; and a water circulation system in which water is circulated and where the water is heated by said heat collecting tubes.

* * * * *